Feb. 21, 1967 W. S. ROUVEROL 3,304,795
NONLUBRICATED FORMED GEARING
Original Filed Jan. 7, 1964
2 Sheets-Sheet 1

INVENTOR.
WILLIAM S. ROUVEROL
BY
*Gordon Wood*
ATTORNEY

INVENTOR.
WILLIAM S. ROUVEROL
BY Gordon Wood
ATTORNEY

3,304,795
NONLUBRICATED FORMED GEARING
William S. Rouverol, 2120 Haste St.,
Berkeley, Calif. 94704
Continuation of application Ser. No. 336,231, Jan. 7, 1964. This application Feb. 28, 1966, Ser. No. 534,578
9 Claims. (Cl. 74—411)

This is a continuation of application Ser. No. 336,231, filed Jan. 7, 1964, now abandoned.

This invention relates to nonlubricated formed gearing of the type disclosed in United States Patent No. 3,169,408. The instant invention relates to specific improvements over the subject matter disclosed in the above patent and which improvements substantially increase the power transmission capacity of the gearing.

Gears having teeth and rims of pliable material such as rubber or other elastomers experience considerable shear deformation in the teeth when the transmitting torque becomes large. As a result of this deformation the tooth pitch for certain portions of the driving and driven gears may be considerably altered. This is particularly true with respect to the teeth that are adjacent the last engaged tooth in the zone of tooth coalescence (see line p–p' in FIG. 5 of Patent No. 3,169,408). At the region adjacent the last engaged tooth in the zone of tooth coalescence the shear deformation reduces the pitch of the incoming tooth of the driving gear and increases the pitch of the corresponding tooth on the driven gear. As a result the teeth of the driving gear tend to ride up the flanks of the teeth of the driven gear causing considerable wear. Only by reducing the transmitted torque can this be prevented and reduction of torque of course correspondingly reduces the power capacity.

The main object of the present invention is, therefore, to provide a construction that prevents tooth climbing and thereby greatly increases the power transmission capacity of the non-lubricated formed gearing and substantially eliminates tooth wear. This improvement in performance is achieved without sacrifice of the objects and advantages of the subject type of gearing as disclosed in the above mentioned patent.

Further objects and advantages of the invention will be apparent from the following specification and from the drawings wherein.

Although the drawings show external spur gears it will be understood that the instant invention is not limited to this type but is applicable to various other types of gearing including helical, bevel and internal gears. It will also be understood that only one gear is shown in each of the figures and it may be assumed that the mating gear is identical, except perhaps in size, to that illustrated.

Figure 1:
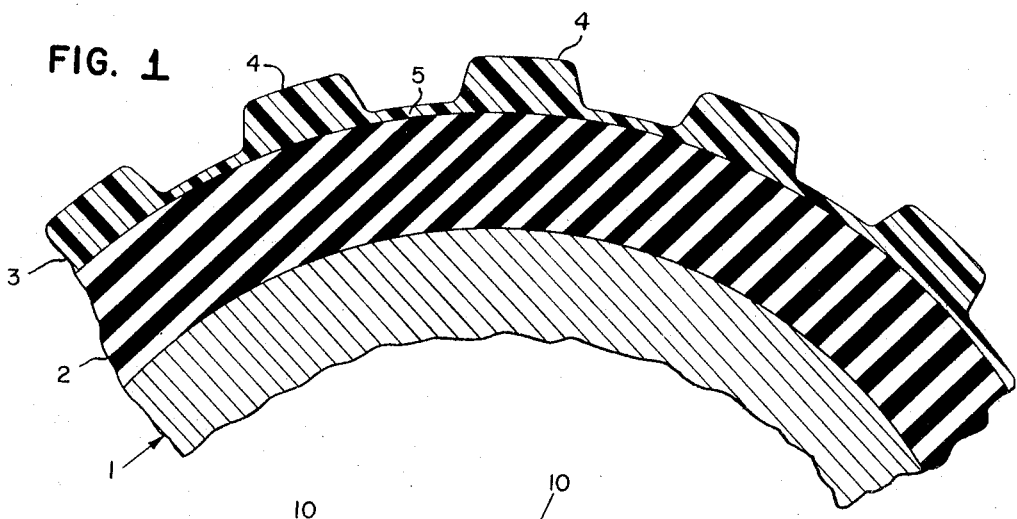
FIGS. 1 through 6 are tooth profile sections of gears incorporating the various forms which the present invention may take.

In each of the forms of the invention there is preferably provided a central hub portion indicated at 1 which may be of steel or other conventional material and provided with means for securing the same to a shaft (not shown). By the present invention there is integrally secured to the periphery of hub 1 by adhesive or by other convenient means a backing ring 2 preferably of relatively soft rubber or other elastomer having similar characteristics. Secured to the outer periphery of the backing ring 2 is a rim member 3 which, as shown in FIG. 1, is relatively thin in radial extent but of sufficient thickness to be formed with gear teeth 4 and still retain a thin section 5 between the root circle of the teeth and the outer periphery of the backing ring 2. In the case of an internal gear the above described parts will of course be reversed in a radial direction.

Soft nylon is a preferred material for the rim 3 but other plastics may also be employed. The modulus of the elasticity of the material forming rim 3 should be between 30,000 and 50,000 lbs./sq. in. although some high strength plastics with moduli of 100,00 to 200,000 lbs./sq. in. might work depending upon the other dimensions and the particular capacities desired. The rigidity of the backing ring 2 is considerably less than the rigidity of the outer rim 3 on which the teeth 4 are formed. By the term "rigidity" as used in this application, the ordinary meaning of resistance to deformation is intended. Furthermore, it is the total deformation under load that is meant by the term "rigidity" and not unit deformation under a given load.

Assuming the modulus of elasticity of the rim 3 to be substantially greater than the modulus of elasticity of the backing ring 2 it will be apparent that the rigidity of the gear under normal loading is greater in the tangential direction than in the radial direction. In other words, under comparable loading, the gear will deform radially inwardly to a greater extent than it deforms circumferentially. In this connection it will be noted that the rim 3 will undergo bending in connection with such radial inward deformation because of the relatively thin section 5. Furthermore, since the modulus of elasticity of the backing ring 2 is relatively low, the yieldability of backing ring 2 will also permit the relatively large radial deformation above noted.

The important consequence of the above described structure is that there is less likelihood of a change in the effective pitch of the gear teeth especially at the last engaged tooth of the driven gear. Thus, all of the advantages obtained in this type of gearing as set forth in the aforementioned patent are attained and, in addition, the tendency for the teeth to wear because of interference is substantially eliminated.

Figure 2:
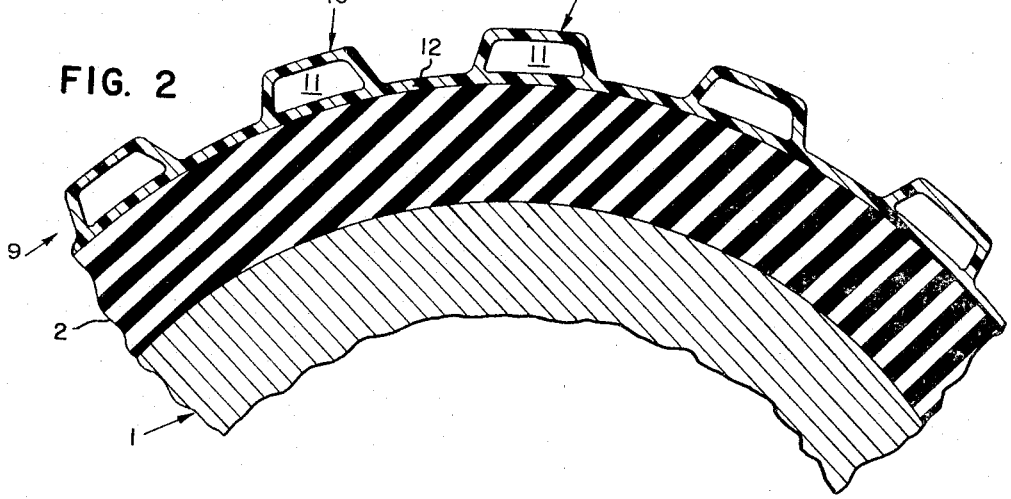

In view of the fact that the rim material is of considerably higher modulus of elasticity than the backing ring, it is preferable in some instances to modify the gear tooth construction as shown in FIG. 2. In FIG. 2 the structure is substantially the same as in FIG. 1 in that the backing ring 2 and the hub portion 1 may be identical. However, in constructing the gear teeth 10 of FIG. 2 the mold is provided with inserts to provide through openings 11 extending between the opposite sides of the gear. By this construction any tendency for the gear teeth not to deflect in bending under load is reduced and the teeth of one gear more readily conform to the spaces between the teeth of the mating gear. However, it will be noted that the built-in rigidity of the construction is not reduced in a tangential direction because the relatively thin section between the gear teeth and the inner periphery of rim 9 has a relatively high rigidity.

It will be noted that the gear teeth in FIGS. 1 and 2 are shown somewhat elongated in a circumferential direction compared to their radial height. Although this construction is preferable, other constructions of the teeth are possible without departing from the scope of this invention. For example, a construction approaching saw tooth gears may be employed such as shown in FIG. 3.

Figure 3:
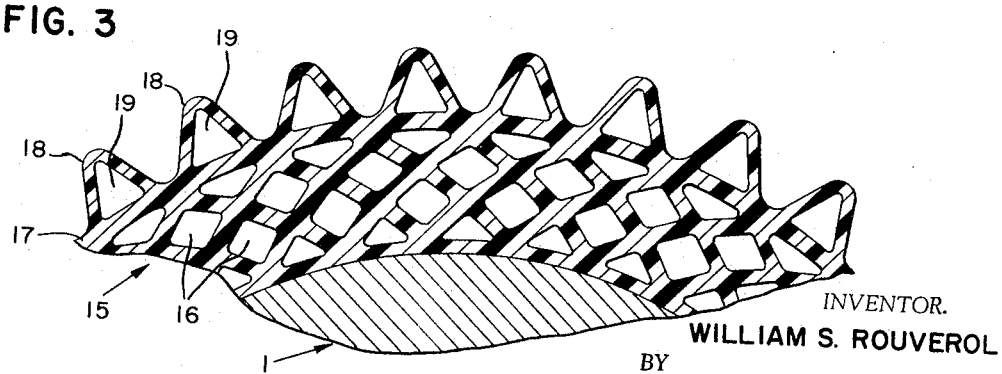

The construction of FIG. 3 eliminates the use of two materials outwardly of the hub 1 and instead rubber of moderate hardness or a similar elastomer may be employed to form the entire rim and backing up structure of the gear. In FIG. 3 the material from the outer periphery of the hub 1 to the addendum circle of the teeth may be made of rubber and molded so as to provide a plurality of through openings 16 extending between opposite sides of the gear. Between the inner portion of the rim which is provided with the openings 16 and the gear teeth 18 there is provided a solid continuous ring 17 which may be relatively thin in radial extent. The teeth 18 are also provided with through openings 19 extending between opposite sides of the gear so as to reduce the rigidity of the structure in a radial direction and at the same time retain relatively higher rigidity in a tangential direction. In lieu of moderately hard rubber in the structure of FIG. 3 a soft nylon may be employed, the important consideration being that rigidity be built in to the structure in a tangential direction to a greater degree than in a radial direction.

Figure 4:
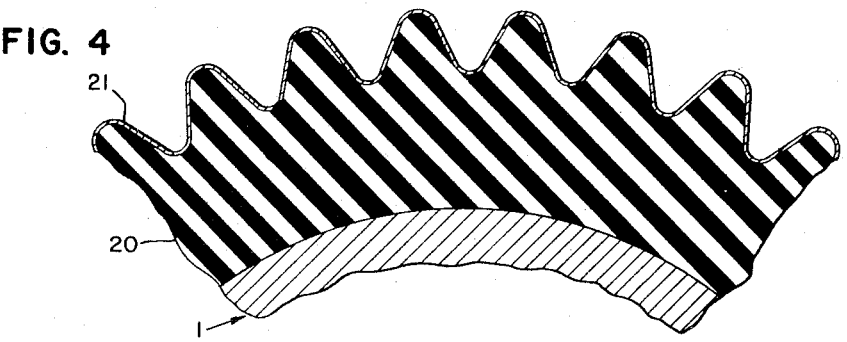

The advantages of the invention may also be obtained by substituting a relatively thin steel rim in lieu of the nylon above described. In this case, as shown in FIG. 4, the backing ring 20 is formed substantially to the shape of the completed gear but there is integrally molded therewith a thin ribbon of steel 21 so that metal-to-metal engagement is present when the teeth are running. In this case it will be apparent that circumferential rigidity is achieved through the relatively high modulus of elasticity of steel and at the same time radial deformation is permitted because the backing ring 20, made of rubber or similar elastomer, has relatively low resistance to deformation in a radial direction.

Figure 5:
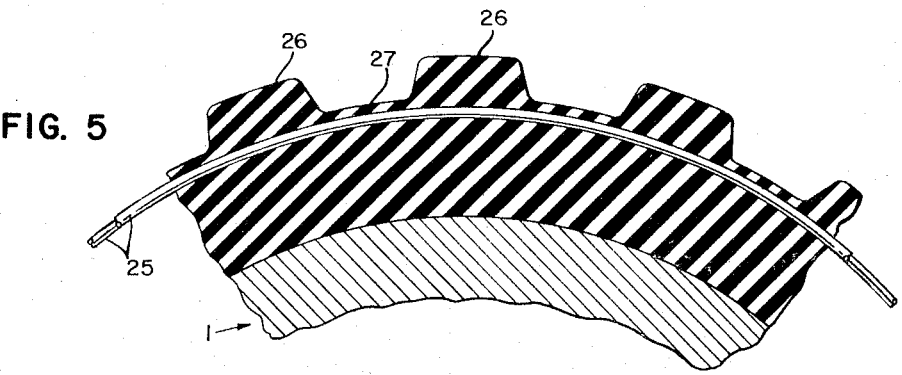

The result obtained by the structures of FIGS. 1 and 2 may also be achieved as shown in FIG. 5 by the provision of a plurality of axially spaced wire hoops 25 of steel or the like interposed between the gear teeth and the backing ring. In this case the backing ring and teeth are molded as a unit from rubber or soft nylon and in the molding process the hoops 25 are inserted so as to withstand the tangential loading. It will be noted in FIG. 5 that the hoops 25 are spaced slightly inwardly from the roots of the teeth 26 so as to provide a relatively thin section 27 between said roots and said hoops 25.

Figure 6:
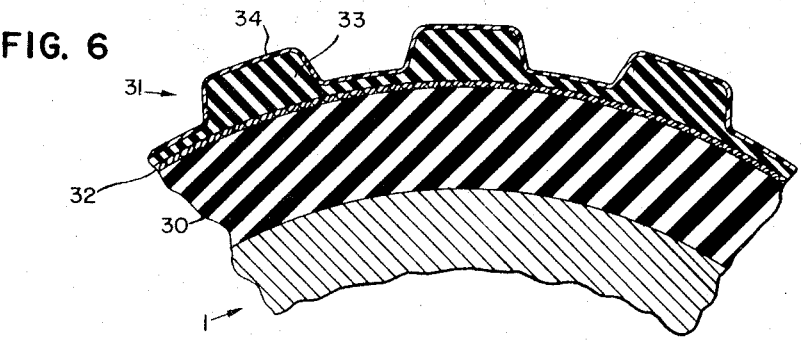
Figure 7:
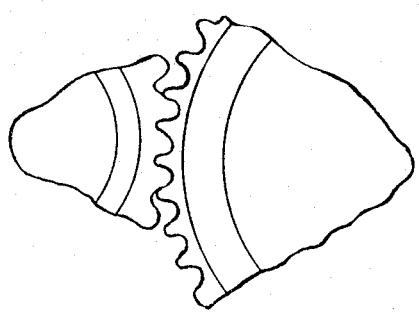
FIG. 7 is a semischematic fragmentary side view of a pair of mating gears of the present invention.

A similar simplified manufacture may be effected by incorporating a conventional timing belt in the gear construction as seen in FIG. 6. In this case the usual backing ring 30 is provided to which is fixedly secured as by adhesive a conventional timing belt generally designated 31. Although the rim structure may, of course, be readily manufactured for this special purpose, it is possible to use a conventional timing belt such as, for example, the type available under the trademark "Gilmer." Since such timing belts are employed with the teeth directed inwardly, all that is required is to turn the timing belt inside out so that the teeth are directed outwardly and secure the same to the rubber backing ring 30.

Said timing belt or its equivalent includes an inner layer of fabric 32 to which is integrally secured a rubber rim portion 33 covered with a nylon facing 34. The nylon facing 34 is relatively thin but has good wearing qualities and is permitted to yield inwardly against the inherent yieldability of the rubber 33 and the rubber ring 30. By this construction the general objects of the invention are achieved, that is, the radial rigidity of the assembly is considerably less than the tangential rigidity so that the desired radial deformation may take place without the tangential deformation becoming so large as to result in one tooth climbing on its mating tooth.

It has been found that gears manufactured in accordance with the present invention are able to transmit an amount of power commensurate with that transmitted by metal gears of similar size because of the fact that several teeth contribute to transmitting the torque and the unusually high bearing stress associated with conventional metal gears is not present. Furthermore, the heat dissipation in the gears of the instant invention is extremely good and the noise level is considerably below that of conventional metal gearing.

The very specific description given above of the preferred forms of the invention is not to be taken as restrictive since it will be apparent to those skilled in the art that various modifications of design nature may be resorted to without departing from the scope of the following claims.

I claim:
1. A gear including an elastomer toothed rim, the teeth of said rim including axially extending openings to reduce the resistance to bending of said teeth under load applied to said teeth in a radial direction.
2. A gear construction that includes a pair of mating gears each provided with a power transmitting rim, the rim of each of said gears comprising a toothed ring of yieldable material and a backing ring of yieldable material on the side of said toothed ring opposite the mating gear, said rim providing substantially less rigidity in a radial direction than in a tangental direction.
3. Gear construction according to claim 2 wherein said toothed ring is readily deformable in a radial direction under loading by the mating gear and being relatively rigid in a tangential direction.
4. Gear construction according to claim 2 wherein said toothed ring is supported only on said backing ring and said backing ring is supported on a rigid hub, and wherein radial deformation of said rim under loading by the mating gear is resisted only by said toothed ring, backing ring and hub.
5. Gear construction according to claim 2 wherein said backing ring is of substantially greater radial extent than said toothed ring.
6. A gear construction that includes a pair of mating gears, each of said gears comprising:
a rigid hub,
a power transmitting rim fixed to said hub and comprising a toothed ring of yieldable material and a backing ring of yieldable material interposed between said toothed ring and said hub,
said backing ring being of a material having a substantially lower modulus of elasticity than the material of said toothed ring whereby said ring deforms in a radial direction under loading to a substantially greater extent than in a tangential direction.
7. A gear construction according to claim 6 wherein a circumferentially extending tension member is interposed between said toothed ring and said hub.
8. A gear construction according to claim 7 wherein said tension member is a continuous hoop of relatively high modulus of elasticity.
9. A gear construction according to claim 7 wherein said tension member is of a fabric.

References Cited by the Examiner
UNITED STATES PATENTS

| | | | |
|---|---|---|---|
| 820,789 | 5/1906 | Hutchins | 74—460 |
| 2,753,731 | 7/1956 | McWethy | 74—443 |
| 3,078,206 | 2/1963 | Skura | 74—231 X |
| 3,216,267 | 11/1965 | Dolza | 74—411 X |

DAVID J. WILLIAMOWSKY, Primary Examiner.

L. H. GERIN, Assistant Examiner.